(12) United States Patent
Knoke et al.

(10) Patent No.: US 12,078,258 B2
(45) Date of Patent: Sep. 3, 2024

(54) PNEUMATIC VALVE APPARATUS FOR A COMPRESSED AIR DEVICE, AND TRANSMISSION-CONTROL OR CLUTCH SYSTEM COMPRISING THE PNEUMATIC VALVE APPARATUS

(71) Applicants: nass magnet GmbH, Hannover (DE); ZF CV Systems Europe BV, Brussels (BE)

(72) Inventors: Stefan Knoke, Hannover (DE); Holger Spalek, Barsinghausen (DE); Sebastian Westphal, Laatzen (DE)

(73) Assignees: NASS MAGNET GMBH, Hannover (DE); ZF CV SYSTEMS EUROPE BV, Brussels (BE)

( * ) Notice: Subject to any disclaimer, the term of this patent is extended or adjusted under 35 U.S.C. 154(b) by 55 days.

(21) Appl. No.: 17/775,593

(22) PCT Filed: Nov. 3, 2020

(86) PCT No.: PCT/EP2020/080759
§ 371 (c)(1),
(2) Date: May 10, 2022

(87) PCT Pub. No.: WO2021/094128
PCT Pub. Date: May 20, 2021

(65) Prior Publication Data
US 2022/0390032 A1 Dec. 8, 2022

(30) Foreign Application Priority Data
Nov. 12, 2019 (DE) .................. 10 2019 130 523.3

(51) Int. Cl.
*F16K 27/02* (2006.01)
*B60T 13/68* (2006.01)
(Continued)

(52) U.S. Cl.
CPC .......... *F16K 27/029* (2013.01); *B60T 13/683* (2013.01); *B60T 15/54* (2013.01);
(Continued)

(58) Field of Classification Search
CPC ......... F16K 31/0627; Y10T 137/86622; Y10T 137/8667; Y10T 137/86694
See application file for complete search history.

(56) References Cited

U.S. PATENT DOCUMENTS 3,895,648 A  7/1975 Stoll et al.
4,298,027 A * 11/1981 Neff .................... F15B 13/0431
                                                              137/906
(Continued)

FOREIGN PATENT DOCUMENTS

AT         332187 B     9/1976
CN      203627601 U     6/2014
(Continued)

*Primary Examiner* — Robert K Arundale
(74) *Attorney, Agent, or Firm* — LEYDIG, VOIT & MAYER, LTD.

(57) ABSTRACT

A pneumatic valve apparatus for a compressed air device, including: a pneumatic solenoid valve having a housing body with a supply channel, a consumer channel and a vent channel, wherein the housing body surrounds a valve chamber, in which a valve body can be moved along a valve axis counter to the force of a valve spring by an actuator relative to a vent valve seat leading to the vent channel and relative to a supply valve seat leading to the supply channel, wherein in a first position, the valve body opens the valve chamber and the vent valve seat leading to a vent channel, and, in a second position, opens a supply channel leading to the supply valve seat and the valve chamber, wherein the housing body comprises a diffuser, which adjoins the vent valve seat leading to the vent channel.

23 Claims, 4 Drawing Sheets

(51) Int. Cl.
*B60T 15/54* (2006.01)
*B60T 17/00* (2006.01)
*F16K 31/06* (2006.01)

(52) U.S. Cl.
CPC ........ *B60T 17/008* (2013.01); *F16K 31/0627* (2013.01); *Y10T 137/86622* (2015.04)

(56) References Cited

U.S. PATENT DOCUMENTS

| | | | |
|---|---|---|---|
| 4,880,033 A | | 11/1989 | Neff |
| 6,405,757 B1* | | 6/2002 | Jabcon ................ F16K 31/0606 251/129.21 |
| 10,054,242 B2* | | 8/2018 | Weber ................... F16K 27/029 |
| 2001/0023931 A1 | | 9/2001 | Fukano |
| 2002/0079004 A1* | | 6/2002 | Sato ...................... F16K 11/044 137/625.65 |
| 2002/0079005 A1* | | 6/2002 | Yoshida ................ F16K 31/082 137/625.65 |
| 2015/0176606 A1 | | 6/2015 | Yamada et al. |

FOREIGN PATENT DOCUMENTS

| | | | |
|---|---|---|---|
| CN | 104806785 A | 7/2015 | |
| DE | 4007009 A1 | 9/1990 | |
| DE | 4416279 A1 | 11/1995 | |
| DE | 10355627 A1 | 6/2005 | |
| DE | 60108282 T2 | 3/2006 | |
| DE | 102006031380 A1 | 1/2008 | |
| EP | 2818779 A1 | 12/2014 | |
| GB | 911160 A | 11/1962 | |
| JP | 2015140843 A | 8/2015 | |
| WO | WO 9744580 A1 | 11/1997 | |

\* cited by examiner

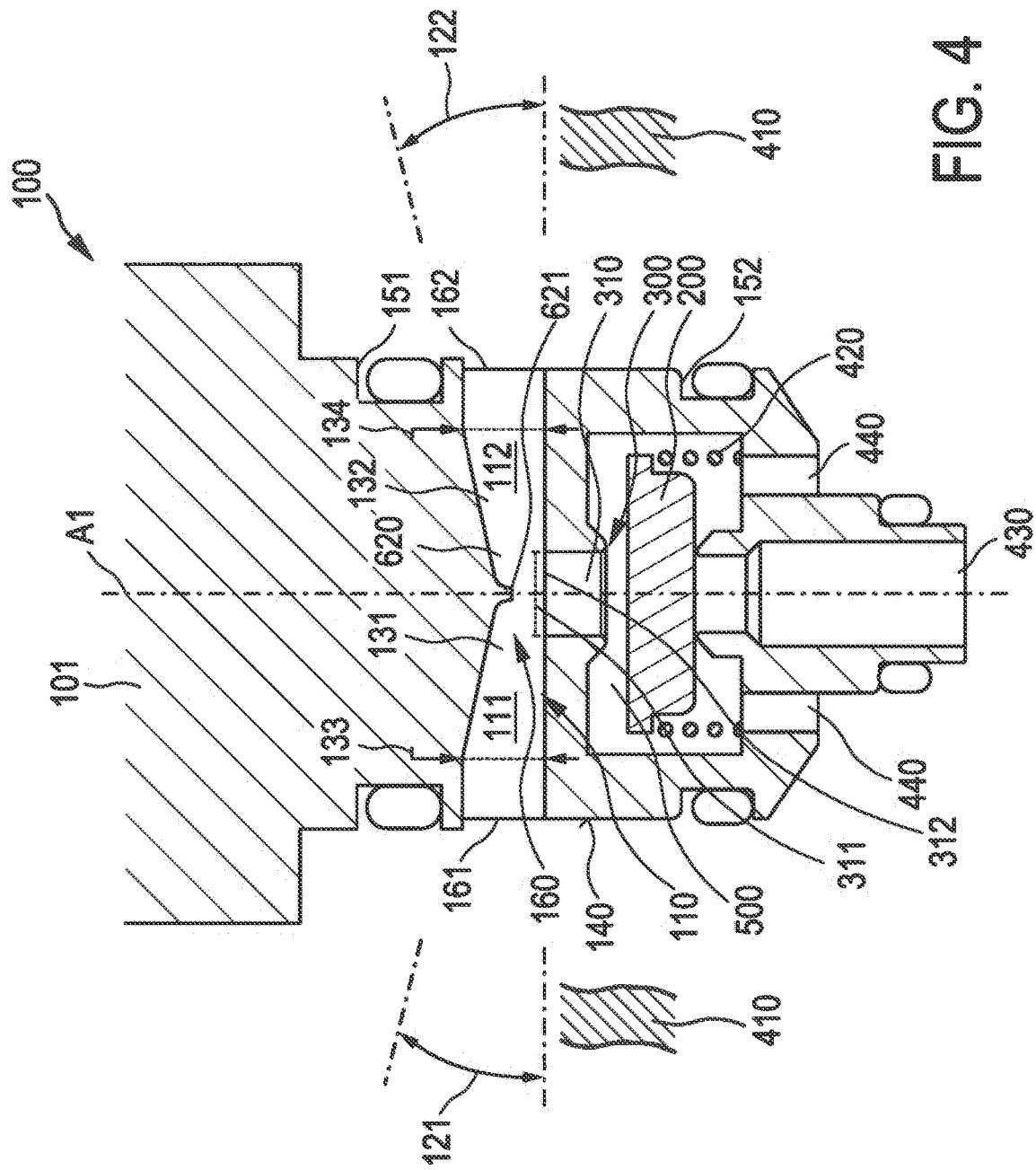

PNEUMATIC VALVE APPARATUS FOR A COMPRESSED AIR DEVICE, AND TRANSMISSION-CONTROL OR CLUTCH SYSTEM COMPRISING THE PNEUMATIC VALVE APPARATUS

CROSS REFERENCE TO RELATED APPLICATIONS

This application is a U.S. National Phase application under 35 U.S.C. § 371 of International Application No. PCT/EP2020/080759, filed on Nov. 3, 2020, and claims benefit to German Patent Application No. DE 10 2019 130 523.3, filed on Nov. 12, 2019. The International Application was published in German on May 10, 2021 as WO 2021/094128 A1 under PCT Article 21(2).

FIELD

The invention relates to a pneumatic valve apparatus for a compressed air device, in particular having a pneumatic cylinder, in particular for an automatic clutch system or an automated transmission-control and clutch system. The invention also relates to a transmission-control or clutch system having the pneumatic valve apparatus, in particular for commercial vehicles, such as a truck or a passenger bus.

BACKGROUND

A pneumatic valve apparatus may comprise, in particular, a pneumatic solenoid valve. A solenoid valve can be represented as an electromagnetically operated pneumatic solenoid valve which uses a permanent magnet, for example, as part of an actuator in order to hold a valve body in a predetermined position and in order in this way to achieve different switching states in the control of compressed air. A pneumatic solenoid valve is known from WO 97/44580 A1 or from EP 2 818 779 A1, for example.

Such a pneumatic solenoid valve has, in particular, a housing body having a supply channel, a consumer channel and a vent channel. Here, the housing body, in particular having at least one inlet and at least one outlet, surrounds a valve chamber in which a valve body can be moved along a valve axis counter to the force of a valve spring by means of an actuator relative to a vent valve seat leading to the vent channel and relative to a supply valve seat leading to the supply channel. In this sense, the valve body or similar valve element serves to open and close the valve.

The actuator can, in particular, cooperate with a valve spring which exerts a force on the valve body in the opposite direction to the direction of action of the actuator, for example, and thus determines whether the valve is open or closed in the energized state, for example of a magnet. In a first position, a valve body can open a valve chamber and a vent valve seat leading to the vent channel, and, in a second position, can open a supply channel leading to the supply valve seat and the valve chamber.

A maximum flow rate of compressed air through the pneumatic solenoid valve can be substantially limited by a clear width of a valve passage, e.g. by a clear width of the vent valve seat passage.

Furthermore, the power consumption of the actuator can influence the degree of opening and thus likewise the flow rate of the solenoid valve, via its maximum expendable magnetic force. This can mean that conventional solenoid valves have a certain minimum size and a minimum power consumption for a given flow rate.

In principle, EP 2 818 779 A1 describes a solenoid valve with a diffuser characteristic. A valve of this kind is capable of further improvement.

It is desirable to improve or increase the flow rate of a pneumatic solenoid valve, particularly with regard to use with a pneumatic cylinder, in particular in a transmission-control or clutch system, particularly during venting. In particular, this should be possible without the need to substantially increase a clear width of a valve passage and/or the power consumption of the actuator—in this way, a design which is as compact as possible can be achieved, even with an improved or increased flow rate. Pneumatic solenoid valves known to date are capable of further improvement in this respect.

SUMMARY

In an embodiment, the present disclosure provides a pneumatic valve apparatus for a compressed air device having a pneumatic cylinder and configured for an automatic clutch system or an automated transmission-control and clutch system, comprising: a pneumatic solenoid valve comprising a housing body having a supply channel, a consumer channel and a vent channel, wherein the housing body surrounds a valve chamber, in which a valve body can be moved along a valve axis counter to the force of a valve spring by an actuator relative to a vent valve seat leading to the vent channel and relative to a supply valve seat leading to the supply channel, wherein in a first position, the valve body opens the valve chamber and the vent valve seat leading to a vent channel, and, in a second position, opens a supply channel leading to the supply valve seat and the valve chamber, wherein the housing body comprises a diffuser, which adjoins the vent valve seat leading to the vent channel, wherein the cross section of a diffuser channel of the diffuser widens from the vent valve seat to the vent channel, and the diffuser channel runs transversely to the valve axis, and a vent valve seat passage has a clear width that is less than a second clear width of the diffuser channel.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 4 shows the structure of a pneumatic valve apparatus, in the form of one of the pneumatic solenoid valves in the form of a 3/2-way valve according to an embodiment, in the first position as shown in FIG. 3A, for venting, with the diffuser, which adjoins the vent valve seat leading to the vent channel, wherein the cross section of the diffuser channel of the diffuser widens from the vent valve seat to the vent channel.

DETAILED DESCRIPTION

Figure 1:
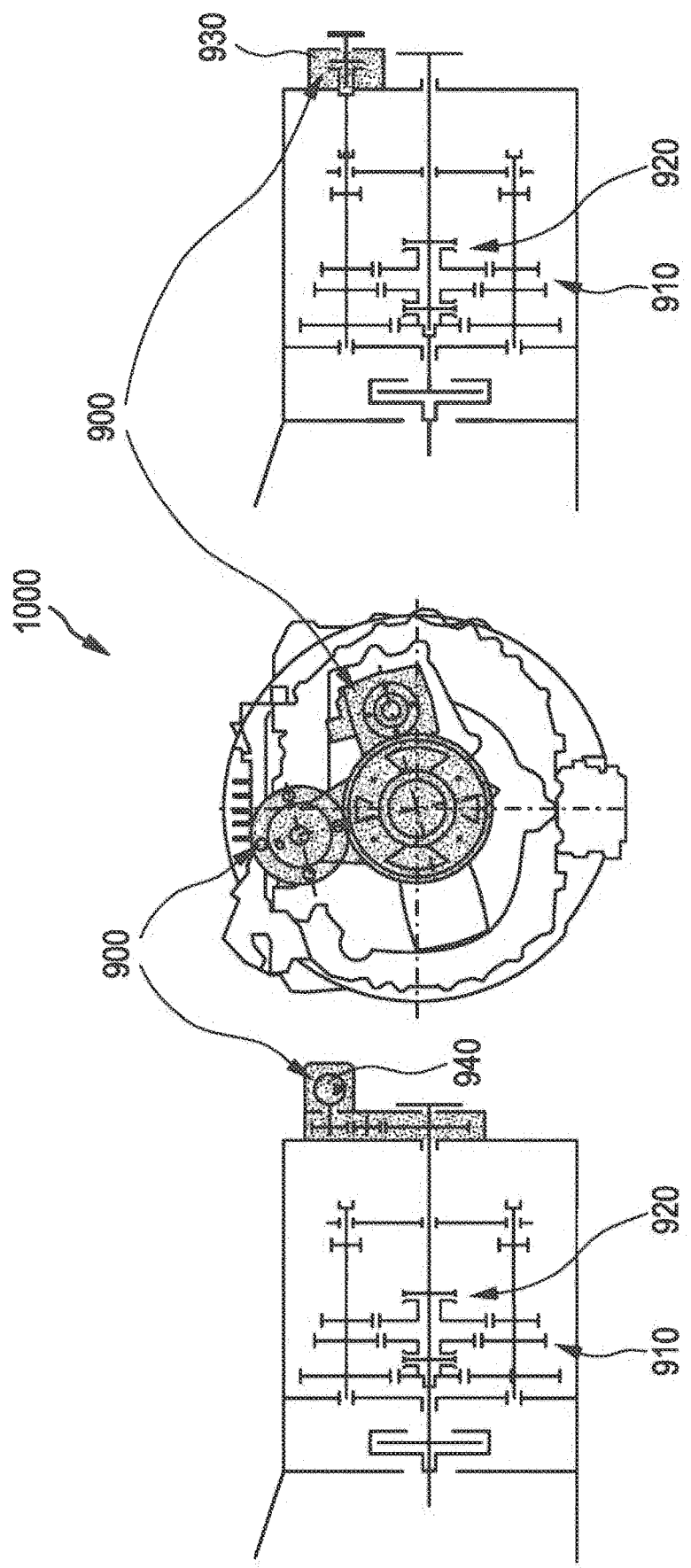
FIG. 1 is a symbolic representation of a transmission for a pneumatic solenoid valve according to an embodiment of a pneumatic valve apparatus for a compressed air device.

Embodiments of the present invention specify a pneumatic valve apparatus, in particular having a pneumatic cylinder, in which a flow rate of a pneumatic solenoid valve is improved, particularly with regard to use with a pneumatic cylinder, preferably in a transmission-control or clutch system.

Such a pneumatic valve apparatus, in particular having a pneumatic cylinder, in particular for an automatic clutch system or an automated transmission-control and clutch system, comprises:
- a pneumatic solenoid valve comprising a housing body having a supply channel, a consumer channel and a vent channel, wherein
- the housing body surrounds a valve chamber, in which a valve body can be moved along a valve axis counter to the force of a valve spring by means of an actuator relative to a vent valve seat leading to the vent channel and relative to a supply valve seat leading to the supply channel, wherein
- in a first position, the valve body opens the valve chamber and the vent valve seat leading to a vent channel, and, in a second position, opens a supply channel leading to the supply valve seat and the valve chamber.

According to the invention, it is envisaged in the pneumatic valve apparatus that the housing body comprises a diffuser, which adjoins the vent valve seat leading to the vent channel, wherein the cross section of a diffuser channel of the diffuser widens from the vent valve seat to the vent channel, and
- the diffuser channel runs transversely to the valve axis, and a vent valve seat passage has a clear width that is less than a second clear width of the diffuser channel.

The valve body, which is mounted so as to be movable along a valve axis counter to the force of a valve spring by means of an actuator relative to a vent valve seat and a supply valve seat, permits two switching positions of the solenoid valve.

In other words, according to the concept of the invention, it is envisaged that the vent channel is integrated into the housing body and the vent channel has a diffuser, which adjoins the vent valve seat transversely. Moreover, the cross section of a diffuser channel of the diffuser widens from the vent valve seat to the vent channel outlet, wherein the vent channel runs transversely to the valve axis. The vent valve seat passage has a clear width that is less than a second clear width of the diffuser channel.

The invention starts from the consideration that air is accelerated in the case of a cross-sectional expansion. This enables faster venting of the solenoid valve, even if the diameter of the vent valve seat passage remains at least the same. The invention has recognized that power consumption is influenced by the degree of opening from the vent valve seat to the vent channel outlet.

The invention has recognized that, by using a diffuser, an improved flow rate can be achieved, in particular for the purpose of being able to reduce the power consumption of the solenoid valve. In addition, the invention has recognized that an improved flow rate is made possible by a diffuser which is fitted transversely—in particular orthogonally—to the valve axis. By means of the air deflection resulting from the diffuser mounted transversely—in particular orthogonally—to the valve axis, and through the special shaping of the vent with the diffuser leading to the vent channel, an acceleration of the flow air from the vent valve seat to the vent channel is achieved by means of the transversely mounted diffuser. This leads to a significantly higher effective nominal venting width.

Furthermore, a flow rate that reduces power consumption is made possible with less installation space. In particular, the installation space is adapted to the use of the pneumatic valve apparatus for a compressed air device, in particular having a pneumatic cylinder, in particular for an automatic clutch system or an automated transmission-control and clutch system.

In an embodiment, a system comprises a pneumatic cylinder, for a compressed-air device, in particular a transmission brake, and a pneumatic valve apparatus according to the invention, namely having a pneumatic solenoid valve comprising a housing body having a supply channel, a consumer channel and a vent channel. According to an embodiment of the invention, it is envisaged that the supply channel of the pneumatic solenoid valve is connected to a pressure chamber of the pneumatic cylinder for venting and admitting compressed air.

The supply channel of the pneumatic solenoid valve is advantageously connected to a pressure chamber of the pneumatic cylinder for venting in the first position of the valve body of the solenoid valve and for admitting air in the second position of the valve body of the solenoid valve.

The general construction of the solenoid valve preferably corresponds to that of a 3/2-way valve.

In the valve apparatus, in the first position, the consumer channel is preferably opened via the valve chamber to the vent channel, and the supply valve seat is closed. In addition or alternatively, in the valve apparatus, in the second position, the supply channel is preferably opened via the valve chamber to the consumer channel, and the vent valve seat is closed.

Provision is preferably made, in the first position, for the valve body to open the valve chamber via the vent valve seat, toward the vent channel, and to block the supply channel. Furthermore, provision is preferably made, in the second position, for the valve body to open the supply channel to the supply valve seat and to block the vent channel via the vent valve seat.

The valve apparatus advantageously has a wall in the housing body which surrounds the valve chamber, wherein the diffuser channel runs in the wall, and therefore the diffuser is integrated into the housing body. It is advantageous that, starting from the vent valve seat, the diffuser channel runs transversely to the valve axis.

The vent valve seat preferably has a vent valve seat passage with a first clear width and a vent valve seat outlet with a second clear width. The first and second clear widths are advantageously below a certain value.

In particular, the vent valve seat can have a clear width that is greater than a nominal air admission width of the supply channel. The vent valve seat preferably has a vent valve seat passage and a vent valve seat outlet, each with a clear width that is greater than that of the nominal air admission width of the supply channel.

A first clear width of the diffuser channel, adjacent to the vent valve seat outlet, has a first clear width in the range between a first specific value and a second specific value; the first and second specific values lie in the mm range, for example.

A second clear width of the diffuser channel, adjacent to the first outlet of the vent channel, has a second clear width in the range between a further first specific value and a further second specific value; the first and second further specific values lie in the mm range, for example.

The diffuser channel can optionally have a flow baffle element and/or flow guide element. The first clear width of the diffuser channel, adjacent to the vent valve seat outlet, is preferably less than the second clear width of the diffuser channel, adjacent to the first outlet of the vent channel.

Along a valve axis, the vent valve seat has a length in the range of a first specific length value and a second specific length value. The diffuser channel advantageously has a length transversely to the valve axis in the range of a first and second length value; the first and second length values are preferably in the mm range.

It is advantageous that an inner wall of the diffuser channel is designed as a flow baffle element in the diffuser channel, opposite the vent valve seat passage. In an embodiment—additionally or alternatively—a pin-shaped flow guide element is mounted along the valve axis on the inner wall of the diffuser channel, opposite the vent valve seat passage.

In a development, the flow baffle element may be a flow edge which is directed counter to a venting direction, toward the vent valve seat, in particular a flow tip or a flow web.

The housing body preferably has an upper seal groove and a lower seal groove on the outside, wherein the diffuser adjoins in a plane between the upper and lower seal grooves.

In an embodiment, the diffuser channel has a first section of cylindrical and/or frustoconical design. In a further development, the diffuser channel has a second section of curved design, in particular in the form of a horn.

The valve chamber advantageously runs along the valve axis, and the diffuser channel runs radially thereto, in particular the diffuser channel runs radially with subsections aligned perpendicularly to the valve axis. In principle, however, any alignment of the diffuser channel transversely, that is to say, in particular, obliquely or perpendicularly to the valve axis, is advantageous.

In an embodiment, the diffuser has at least a first radially aligned diffuser channel along a first diffuser angle. In an embodiment, the diffuser has a first radially aligned diffuser channel along a first diffuser angle and a second radially aligned diffuser channel along a second diffuser angle. A first and second diffuser channel are advantageously situated opposite one another, symmetrically to the valve axis.

In another advantageous development, the diffuser channel is arranged annularly around the valve axis.

Embodiments of the invention are now described below with reference to the drawing. These are not necessarily intended to represent the embodiments to scale; on the contrary, the drawing is executed in schematic and/or slightly distorted form, where useful for explanation. With regard to additions to the teachings directly recognizable from the drawing, attention is drawn to the relevant prior art. It should be borne in mind here that many modifications and changes relating to the form and detail of an embodiment can be made without departing from the general concept of the invention. The features of the invention which are disclosed in the description, in the drawing and in the claims may be essential for the development of the invention, both individually and in any desired combination. Moreover, all combinations of at least two of the features disclosed in the description, in the drawing and/or in the claims fall within the scope of the invention. The general concept of the invention is not limited to the exact form or detail of the a single embodiment shown or described below, nor is it limited to subject matter which would be restricted in comparison with the subject matter claimed in the claims. In the case of specified dimensioning ranges, the intention is also to disclose values lying within the limits mentioned as limit values and to allow for them to be used and claimed in any way. For the sake of simplicity, the same reference signs are used below for identical or similar parts or parts with identical or similar functions.

FIG. 1 shows symbolically a transmission having a transmission brake 900 as an example of an automatic clutch system or an automated transmission-control and clutch system 1000; in this case, therefore, having a compressed air device in the form of a transmission brake 900 for the transmission 910.

Normally, a torque is transmitted via shafts having a number of gear trains 920, i.e. here an input shaft of the transmission 910, to a countershaft and, from there, to an output shaft. Here, the number of gear trains 920 on the shafts corresponds to the number of gear ratios. A transmission brake 900 can, for example, be constructed as a brake 930 which is actuated pneumatically by means of two two-way valves or by means of a 3/2-way valve and which is connected to the countershaft via a fixed transmission ratio. In particular, such a 3/2-way valve is explained, by way of example, as a pneumatic solenoid valve in accordance with the concept of the invention with reference to FIG. 2 to FIG. 4.

Here, the transmission 910 having the transmission brake 900 is shown merely by way of example and further comprises at least one compressed air source 940, which serves as an energy store for the pneumatically operated components. Usually, the transmission 910 is controlled in a manner by a transmission actuator as a final control element and is acted upon by a gearshift lever unit via a cable harness for vehicle data relating to the gear ratio to be selected. Furthermore, a clutch is controlled by means of a clutch actuator as a final control element. Depending on requirements, an AMT solenoid valve can be used as a clutch actuator or as a gear actuator or as a pilot valve for the pilot control of precisely these components. By way of example, such an AMT solenoid valve can also be implemented as a pneumatic solenoid valve in accordance with the concept of the invention; the following description of a 3/2-way valve can accordingly also be applied, by way of example, to such an AMT solenoid valve.

Figure 2:
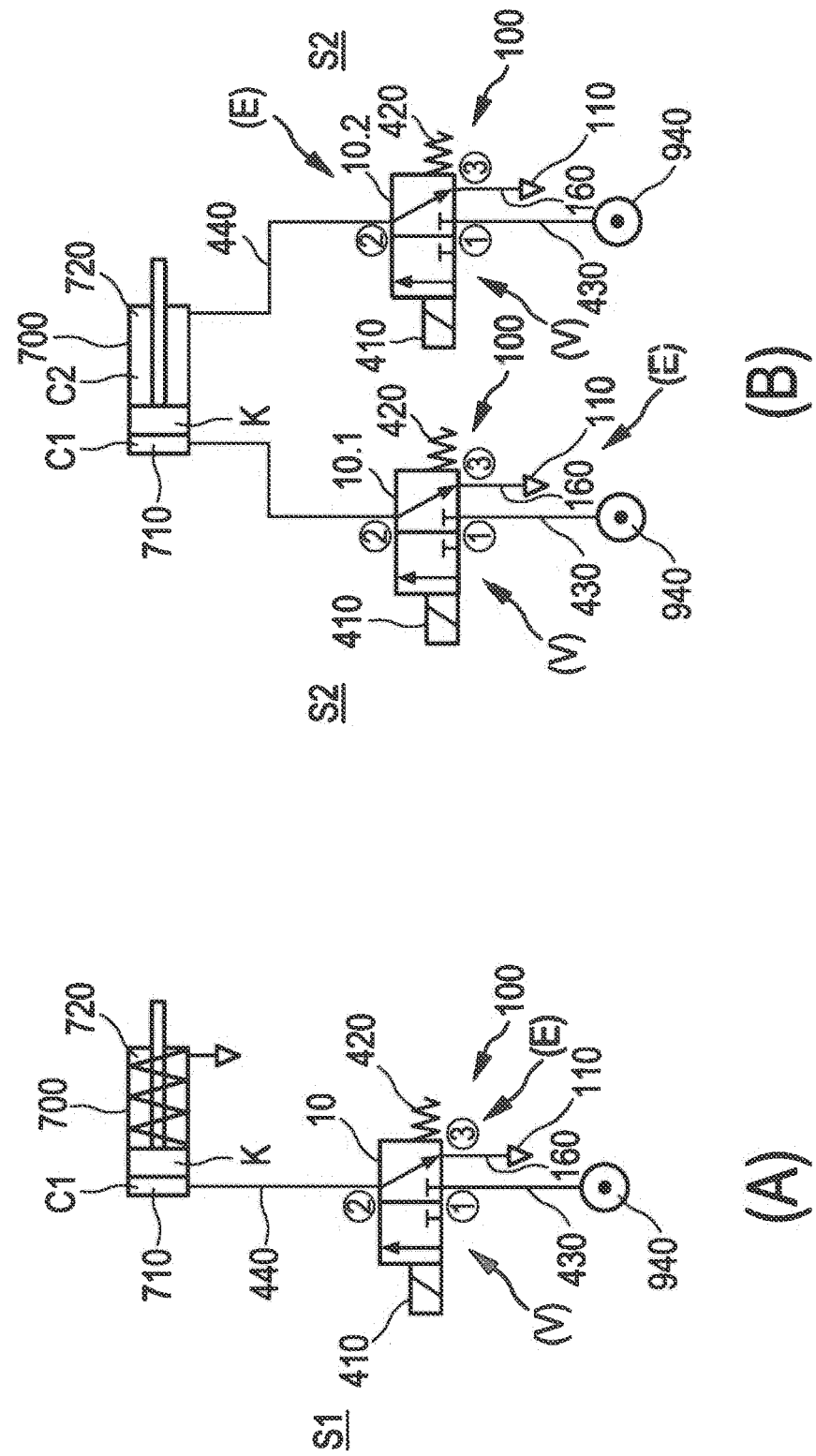
FIG. 2 shows, in view (A), a first circuit diagram of a first arrangement having a pneumatic solenoid valve in the form of a 3/2-way valve according to a first embodiment and, in view (B), a second circuit diagram of a second arrangement having a pneumatic solenoid valve in the form of a 3/2-way valve according to a second embodiment, in each case for the AMT system shown in FIG. 1.

In this respect, the following description of a transmission-control and clutch system 1000, that is to say, in this case, such a system having a compressed air device in the form of a transmission brake 900 for the transmission 910 with a pressure cylinder 700 of FIG. 2 and a pneumatic solenoid valve 10, is to be understood by way of example as one instance of many applications of a pneumatic valve apparatus 100, explained in this way here, for a compressed air device.

In each case for the transmission-control and clutch system 1000 shown in FIG. 1, that is to say, in this case, such a system having a compressed air device in the form of a transmission brake 900 for the transmission 910, FIG. 2 shows in each case an embodiment of a pneumatic valve apparatus 100 having a pneumatic solenoid valve 10 in the form of a 3/2-way valve in a first embodiment in view (A) or having two pneumatic solenoid valves, each in the form of a 3/2-way valve, in a second embodiment in view (B)—in both embodiments, the pneumatic valve apparatus 100 is implemented as a system having a pressure cylinder 700, for example for the transmission brake 900 shown in FIG. 1.

The pneumatic solenoid valve in the form of a 3/2-way valve is shown as a pneumatic graphical symbol. The graphical symbol corresponds to that of a 3/2-way valve with an actuator 410 in the form of an electrically energized magnet for actuating a valve body of the 3/2-way valve counter to the force of a valve spring into two switching states, which can be seen in the symbol of the pneumatic solenoid valve 10 as a 3/2-way valve.

The pneumatic solenoid valve 10 in the form of a 3/2-way valve has a first inlet (1), hereinafter referred to as the "supply port", and a second inlet (2), hereinafter referred to as the "consumer port", as well as an outlet (3), hereinafter referred to as the "vent port".

Also shown in view (A) and view (B) are two possible switching positions of the valve. In a first position (E), the consumer port (2) is pneumatically connected to the vent port (3), while the supply port (1) is blocked. In a second position of the valve (V), the vent port (3) is blocked, while a flow path between the supply port (1) and the consumer port (2) is made possible in a parallel circuit.

In FIG. 2, the valve apparatus 100 has the pneumatic solenoid valve 10, which in turn has or is connected to a supply channel 430, a consumer channel 440 and a vent channel 160. As illustrated in more detail in FIG. 3 and FIG. 4, the supply channel 430 and/or the consumer channel 440 and/or the vent channel 160 are/is integrated into a housing body 101 of the pneumatic solenoid valve 10.

In view (A) of FIG. 2, the supply channel 430 of the pneumatic solenoid valve 10 is connected to a pressure chamber 710 of the pneumatic cylinder 700 for the purpose of venting and admitting compressed air. In view (B) of FIG. 2, the supply channel 430 of the first pneumatic solenoid valve 10.1 (illustrated on the left) is connected to a first pressure chamber 710 of the pneumatic cylinder 700 for the purpose of venting and admitting compressed air, and the supply channel 430 of the second pneumatic solenoid valve 10.2 (illustrated on the right) is connected to a second pressure chamber 720 of the pneumatic cylinder 700 for the purpose of venting and admitting compressed air.

In particular, the first position E of the valve body of the solenoid valve 10, 10.1, 10.2 is provided for venting and the second position V of the valve body of the solenoid valve 10, 10.1, 10.2 is provided for air admission, respectively.

Specifically, in a valve arrangement 100 according to view (A) of FIG. 2, provision is made for compressed air to flow from the compressed air source 940, when it is switched on—in the switching state S1 illustrated—into the consumer channel 440 and from there into the pneumatic cylinder 700, i.e. into the pressure chamber 710, which is here referred to as the pressure chamber C1; switching state S1, (V).

In the case of venting—switching state S2, (E)—compressed air escapes from the pressure chamber 720 of the pneumatic cylinder 700, which is referred to here as the pressure and spring chamber C2, via the vent channel 160 into the atmosphere.

For the application here—e.g. the transmission brake 900 according to FIG. 1—it is advantageous that the compressed air can escape significantly faster than it is supplied. The piston K in the pneumatic cylinder 700 as a spring-return cylinder is pushed back faster with the solenoid valve 10, 10.1, 10.2 according to the concept of the invention since this pneumatic valve apparatus 100 has a diffuser 110, represented symbolically here, on the vent channel 160. As a result, a separate additional rapid venting valve, of the kind that would otherwise normally be used, is no longer required.

In a valve apparatus 100 having a first and a second pneumatic solenoid valve 10.1, 10.2 according to view (B) of FIG. 2, a double-acting pneumatic cylinder 700 is provided; that is, when the first solenoid valve 10.1 is actuated in switching state S1, compressed air flows into the first pressure chamber 710 of the pneumatic cylinder 700, which is here referred to as pressure chamber C1; switching state S1, (V).

In this case, the compressed air is forced out of the opposite chamber of the second pressure chamber 720 of the pneumatic cylinder 700 through the vent channel 160 of the second pneumatic solenoid valve 10.2; switching state S2, (E). The embodiment according to the invention helps to avoid a backpressure and to achieve rapid movement of the piston K in the pneumatic cylinder 700, and permits faster venting. As a result, more dynamic performance is possible. This is achieved, for example, when shifting gears by means of a pneumatic cylinder 700 according to the arrangement in view (B) of FIG. 2.

In corresponding fashion, in the reverse direction, compressed air is forced out of the chamber of the first pressure chamber 710 of the pneumatic cylinder 700 through the vent channel 160 of the first pneumatic solenoid valve 10.1; switching state S1, (E).

Figure 3:
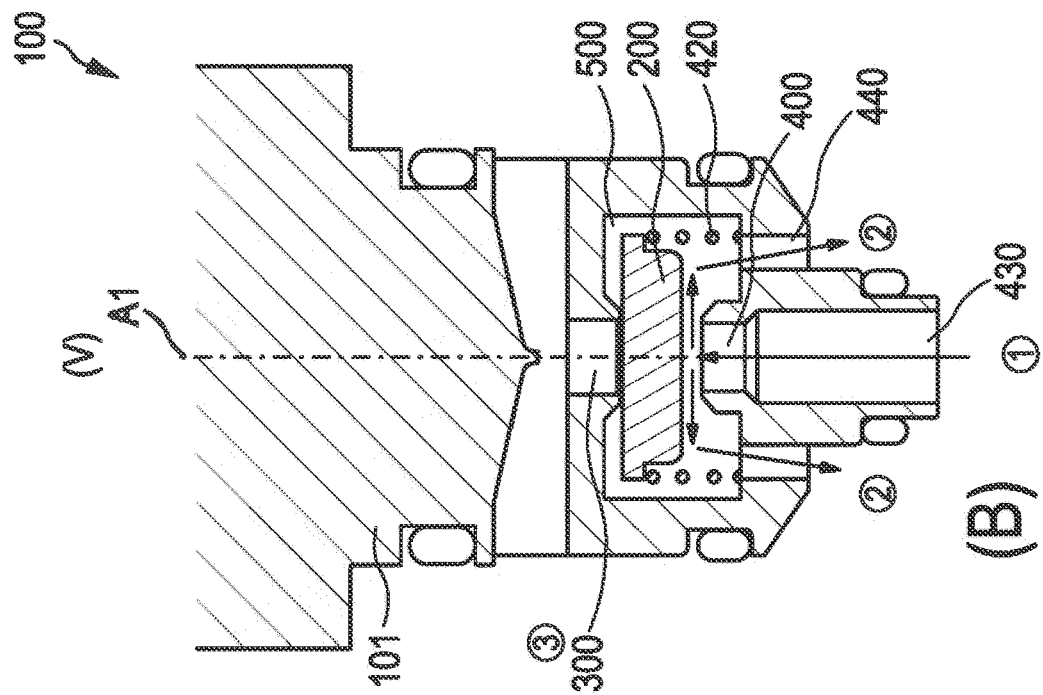
FIG. 3 shows, in a first view (A), a pneumatic valve apparatus in the form of one of the pneumatic solenoid valves in the form of a 3/2-way valve, which shows a venting position, and in a second view (B), a pneumatic valve apparatus, in the form of one of the pneumatic solenoid valves in the form of a 3/2-way valve, in which, in a second position, the valve chamber and the supply valve seat are opened from a supply channel toward a consumer channel.
Figure 3:
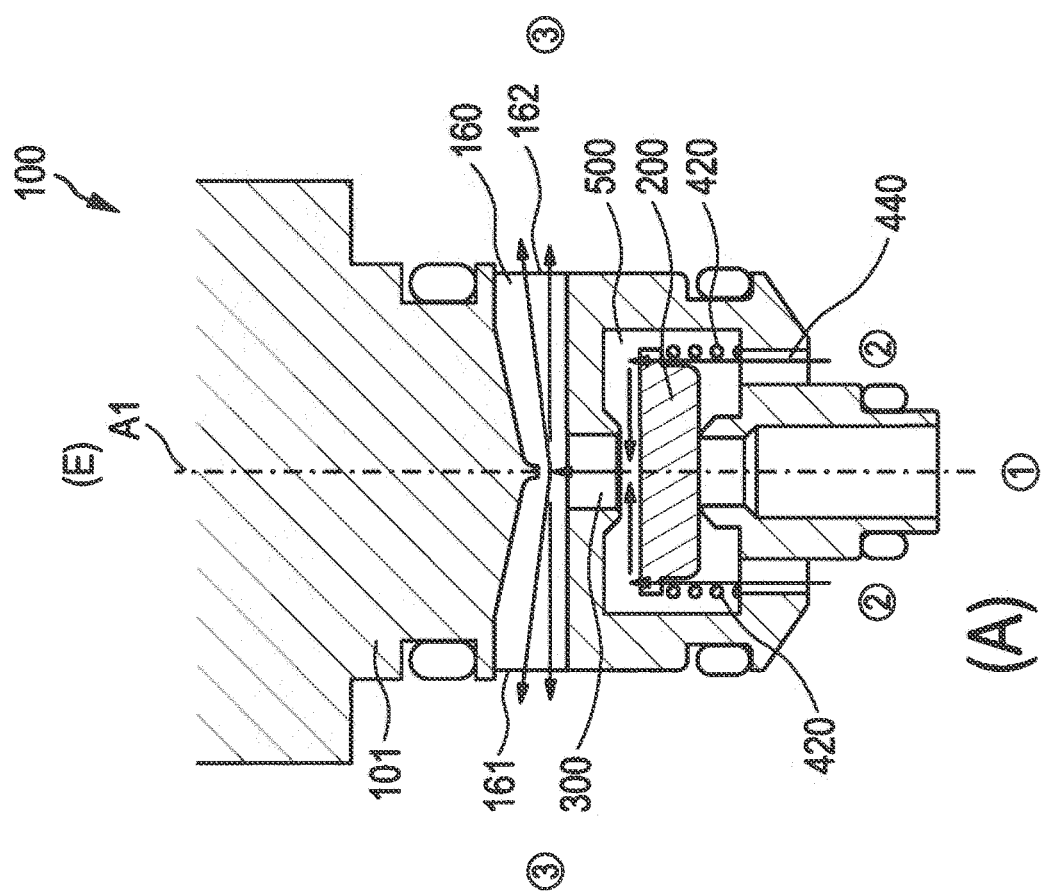

FIG. 3 shows, in view (A) and in view (B), in each case the same pneumatic solenoid valve 10—for instance for implementing the first and second pneumatic solenoid valves 10.1, 10.2 described above in FIG. 2—in the form of a 3/2-way valve in a first and a second switching position for the purpose of explaining the mode of operation and construction of the pneumatic solenoid valve in the form of a 3/2-way valve. The cross section of both illustrative depictions of the solenoid valve 10 is along the axial direction of the valve axis A1.

This illustrates a pneumatic solenoid valve 10 comprising a housing body 101 having a supply channel 430, a consumer channel 440 and a vent channel 160 for a pneumatic valve apparatus 100 for a compressed air device, in particular having a pneumatic cylinder 700, in particular for an automatic clutch system or an automated transmission-control and clutch system 1000 of FIG. 2 or FIG. 1.

Here, the housing body 101 surrounds a valve chamber 500, in which a valve body 200 can be moved along a valve axis A1 counter to the force of a valve spring 420 by means of an actuator 410 relative to a vent valve seat 300 leading to the vent channel 160 and relative to a supply valve seat 400 leading to the supply channel 430.

In a first position E—view (A) of FIG. 3—the valve body opens the valve chamber 500 and the vent valve seat 300 leading to a vent channel 160, and, in a second position V—view (B) of FIG. 3—it opens a supply channel 430 leading to the supply valve seat 400 and the valve chamber 500.

According to the concept of the invention, the housing body 101 comprises a diffuser 110, which adjoins the vent valve seat 300 leading to the vent channel 160, wherein the cross section of a diffuser channel 111 of the diffuser widens from the vent valve seat 300 to the vent channel 160.

According to the concept of the invention, the diffuser channel 111 advantageously runs transversely to the valve axis A1, and a vent valve seat passage 310 has a clear width 311 that is less than a second clear width 131, 132, 133 of the diffuser channel 111.

This solution according to the concept of the invention is further improved in that the vent channel 160 and the diffuser 110 of the solenoid valve 10 are accommodated in the housing body 101 of the latter. Moreover, the vent valve seat 300 has a vent valve seat passage 310 and a vent valve seat outlet 312, which are illustrated in more detail in FIG. 4. Specifically, these have a clear width that is greater than a nominal air admission width of the supply channel 430. That is to say, more specifically, the vent valve seat 300 has a vent valve seat passage 310 and a vent valve seat outlet 312, each with a clear width that is greater than a nominal air admission width of the supply channel 430.

Thus, in a synergistic effect with the aid of the air deflection from the vent valve seat 300 to the vent channel 160 and the diffuser 110—that is as a result of the special arrangement and, where applicable, shaping of the vent channel 160—acceleration of the flowing compressed air is achieved, leading to a significantly greater effective nominal venting width. This is clearly explained in detail from the following explanations.

FIG. 3 shows, in view (A), a first position (E) of the pneumatic solenoid valve in the form of a 3/2-way valve 10, in which the valve body 200 opens the valve chamber 500 via a vent valve seat 300 toward a vent channel 160. This "venting position" E corresponds to the pneumatic connection of the consumer port 2 and the vent port 3, as can be seen in FIG. 3, view (A). In this case, the compressed air to be discharged is passed from a consumer channel 440, via the valve chamber 500 and the vent valve seat 300, toward the vent channel 160 and leaves the solenoid valve 10 through a first and second vent channel outlet 161, 162. Here, the actuator 410 must act counter to the force of the valve spring 420 in order to shut off the valve chamber 500 from the supply valve seat 400, as has been explained with reference to FIG. 2.

In the second position V illustrated in FIG. 3 in view (B), a supply channel 430 leading to the supply valve seat 400 and the valve chamber 500 is open. Compressed air to be discharged can be passed from the supply channel 430, via the supply valve seat 400 and the valve chamber 500, toward a consumer channel 440 and leaves the solenoid valve 10 via this path, corresponding to the circuit of supply port 1 and consumer port 2 illustrated in FIG. 2. In this position, the valve body 200 shuts off the valve chamber 500 from the vent valve seat 300.

In the two valve positions illustrated in view (A) and view (B) in FIG. 3, the consumer channel 440 is open independently of the position of the valve body 200. Depending on the position for venting E or supply V, the direction of flow of the compressed air to be conveyed through the consumer channel 440 changes, this being represented accordingly by the direction lines.

FIG. 4 shows the basic construction of the solenoid valve 10, with an illustrative depiction of the diffuser 110 and with reference to the configuration of the vent channel 160. The vent channel 160 is integrated into the housing body 101 and is situated between an upper seal groove 151 and the vent valve seat passage 310, which is situated centrally on the valve axis A1 and has the clear width 311. It is delimited with respect to the valve chamber 500 by a wall 140 and is formed from two regions, although only the structure situated to the left of the valve axis A1 is described below in the further consideration for reasons of clarity. In the case of this exemplary illustration, the right-hand side of the solenoid valve is of identical construction.

The first region of the vent channel 160 is referred to as a diffuser 110. This is formed by at least one diffuser channel 111, 112, which widens in cross section, starting from the valve axis A1, toward a second clear width of the diffuser channel, which is represented here by a second clear width 133, which can be seen on the left, and a second clear width 134, which can be seen on the right. Here, the cross section of the diffuser channel widens along a diffuser angle, which is represented here by a diffuser angle 121, which can be seen on the left, and a diffuser angle 122, which can be seen on the right.

Within the vent channel 160, the second region of the vent channel directly adjoins the diffuser. This cylindrical vent channel outlet 161, 162 has the second clear width of the diffuser channel 133, 134 and is delimited radially by the wall 140.

In the embodiment illustrated, the diffuser 110 and the vent channel 160 are arranged orthogonally to the valve axis A1 since accommodating the medium outlet in the axial direction would have impaired the functionality of the solenoid valve owing to the installation space. Overall, a larger cross-sectional area is thus available for the venting process than in the case of conventional solenoid valves.

This design solution makes it possible for the medium to be discharged to strike the wall of the vent channel perpendicularly after emerging from the vent valve seat 300. This is assisted by the accommodation of a flow baffle element 620 perpendicularly to the vent valve seat passage 310 in order to keep the flow resistance of the solenoid valve as low as possible. In a development of the invention, the flow resistance can also be reduced by a pin-shaped flow guide element 621 mounted at the same point.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Supply port
2 Consumer port

3 Vent port
10 Pneumatic solenoid valve, in particular 3/2-way valve
100 Pneumatic valve apparatus
101 Housing body
110 Diffuser
111 First diffuser channel
112 Second diffuser channel
121 First diffuser angle
122 Second diffuser angle
131 First clear width of the first diffuser channel
132 First clear width of the second diffuser channel
133 Second clear width of the first diffuser channel
134 Second clear width of the second diffuser channel
140 Wall
151 Upper seal groove
152 Lower seal groove
160 Vent channel
161 First vent channel outlet
162 Second vent channel outlet
200 Valve body
300 Vent valve seat
310 Vent valve seat passage
311 Clear width of the valve seat
312 Valve seat outlet
400 Supply valve seat
410 Actuator
420 Valve spring
430 Supply channel
440 Consumer channel
500 Valve chamber
620 Flow baffle element
621 Pin-shaped flow guide element with flow edge
700 Pneumatic cylinder
710 First pressure chamber
720 Second pressure chamber
800 System of pneumatic solenoid valve 10 with pneumatic cylinder 700
900 Compressed air device in the form of a transmission brake
910 Transmission
920 Gear trains
930 Brake
940 Compressed air source
1000 Transmission-control and clutch system in a transmission
A1 Valve axis
E Venting direction
V Valve
E First position

The invention claimed is:

1. A pneumatic valve apparatus for a compressed air device, comprising: a pneumatic solenoid valve comprising a housing body having a supply channel, a consumer channel and a vent channel, wherein the housing body surrounds a valve chamber, in which a valve body moves along a valve axis counter to the force of a valve spring by an actuator relative to a vent valve seat leading to the vent channel and relative to a supply valve seat leading to the supply channel, wherein in a first position, the valve body opens the valve chamber and the vent valve seat leading to the vent channel, and, in a second position, opens a the supply channel leading to the supply valve seat and the valve chamber, wherein the vent channel of the housing body comprises a diffuser, which adjoins the vent valve seat leading to the vent channel, wherein a cross section of a diffuser channel of the diffuser widens starting from a vent valve seat outlet of the vent valve seat to the vent channel, the diffuser channel runs transversely to the valve axis, and a vent valve seat passage has a first clearance width that is less than a second clearance width of the diffuser channel, and the diffuser channel has a first section of frustoconical configuration and/or has a second section of curved configuration.

2. The valve apparatus as claimed in claim 1, wherein
in the first position, the consumer channel is opened via the valve chamber to the vent channel and the supply valve seat is closed, and
in the second position, the supply channel is opened via the valve chamber to the consumer channel and the vent valve seat is closed.

3. The valve apparatus as claimed in claim 1, wherein the housing body has a wall which surrounds the valve chamber, wherein the diffuser channel runs in the wall, and the diffuser is integrated into the housing body.

4. The valve apparatus as claimed in claim 1, wherein, starting from the vent valve seat, the diffuser channel runs transversely to the valve axis.

5. The valve apparatus as claimed in claim 1, wherein the vent valve seat has the vent valve seat passage with the first clearance width and the vent valve seat outlet with a third clearance width.

6. The valve apparatus as claimed in claim 1, wherein the first clearance width of the vent valve seat is greater than a nominal air admission width of the supply channel.

7. The valve apparatus as claimed in claim 1, wherein the vent valve seat has the vent valve seat passage and the vent valve seat outlet, each having a clearance width that is greater than a nominal air admission width of the supply channel.

8. The valve apparatus as claimed in claim 1, wherein a fourth clearance width of the diffuser channel adjacent to the vent valve seat outlet is less than a fifth clearance width of the diffuser channel adjacent to a first outlet of the vent channel.

9. The valve apparatus as claimed in claim 1, wherein an inner wall of the diffuser channel is configured as a flow baffle element in the diffuser channel opposite the vent valve seat passage.

10. The valve apparatus as claimed in claim 1, comprising a flow baffle element having a flow edge which is directed counter to a venting direction and toward the vent valve seat.

11. The valve apparatus as claimed in claim 1, wherein the housing body has an upper seal groove and a lower seal groove on an outer side of the housing body, and wherein the diffuser adjoins in a plane between the upper and lower seal grooves.

12. The valve apparatus as claimed in claim 1, wherein the second section of the diffuser channel has a curved configuration forming a horn.

13. The valve apparatus as claimed in claim 1, wherein the valve chamber runs along the valve axis, and the diffuser channel runs radially with subsections aligned perpendicularly to the valve axis.

14. The valve apparatus as claimed in claim 1, wherein the diffuser has a first radially aligned diffuser channel along a first diffuser angle and a second radially aligned diffuser channel along a second diffuser angle, the first and second diffuser channels being situated opposite one another and configured symmetrically relative to the valve axis.

15. The valve apparatus as claimed in claim 14, wherein the first diffuser channel and the second diffuser channel are situated opposite one another and configured symmetrically relative to the valve axis.

16. The valve apparatus as claimed in claim 1, wherein the diffuser channel is arranged annularly around the valve axis.

17. A transmission-control or clutch system comprising a pneumatic valve apparatus as claimed in claim 1.

18. The valve apparatus as claimed in claim 1, wherein a flow baffle element is configured as a pin-shaped flow guide element on the valve axis opposite the vent valve seat passage.

19. The valve apparatus as claimed in claim 1, wherein a first region of the vent channel is formed as the diffuser and a second region of the vent channel directly adjoins the diffuser and is formed as a cylindrical vent channel outlet.

20. The valve apparatus as claimed in claim 1, wherein the diffuser is formed by a first and second diffuser channel,
- wherein the second clearance width of the diffuser comprises a left second clearance width of the first diffuser channel and a right second clearance of the second diffuser channel, and
- wherein the first and second diffuser channel each widen in cross section, starting from the valve axis, toward the left second clearance width and the right second clearance width, respectively.

21. A system comprising:
- a pneumatic cylinder for a compressed air device; and
- a pneumatic valve apparatus as claimed in claim 1, wherein
- the supply channel of the pneumatic solenoid valve is connected to a pressure chamber of the pneumatic cylinder to vent compressed air when in the first position and admit compressed air in the second position.

22. A pneumatic solenoid valve for a compressed air device, comprising: a housing body defining a valve axis and a valve chamber in fluid communication with a supply channel, a consumer channel, and a vent channel, the valve chamber being in fluid communication with the vent channel via a vent valve seat passage and a diffuser channel of the vent channel adjoining the vent channel; a valve spring; and a valve body disposed in the valve chamber and moveable along the valve axis counter to the force of the valve spring from a first position to a second position relative to a vent valve seat disposed between the valve chamber and the valve seat passage, and relative to a supply valve seat disposed between the valve chamber and the supply channel, wherein: in the first position, the valve body opens the vent valve seat permitting fluid communication between the valve chamber and the vent channel via the vent valve seat passage and the diffuser channel, in the second position, the valve body opens the supply valve seat permitting fluid communication between the valve chamber and the supply channel, and the diffuser channel runs transversely to the valve axis from the vent valve seat outlet to the vent channel, and defines a cross section that widens starting from a first clearance width adjacent the vent valve seat outlet to a second clearance width adjacent the vent channel, and wherein the vent valve seat passage has a clearance width that is less than the second clearance width of the diffuser channel.

23. A pneumatic valve apparatus for a compressed air device, comprising: a pneumatic solenoid valve comprising a housing body having a supply channel, a consumer channel and a vent channel, wherein the housing body surrounds a valve chamber, in which a valve body can be moved along a valve axis counter to the force of a valve spring by an actuator relative to a vent valve seat leading to the vent channel and relative to a supply valve seat leading to the supply channel, wherein in a first position, the valve body opens the valve chamber and the vent valve seat leading to a vent channel, and, in a second position, opens a supply channel leading to the supply valve seat and the valve chamber, wherein the housing body comprises a diffuser, which adjoins the vent valve seat leading to the vent channel, wherein the cross section of a diffuser channel of the diffuser widens from a vent valve seat outlet of the vent valve seat to the vent channel, the diffuser channel runs transversely to the valve axis, and a vent valve seat passage has a first clearance width that is less than a second clearance width of the diffuser channel, and the diffuser has a first radially aligned diffuser channel along a first diffuser angle and a second radially aligned diffuser channel along a second diffuser angle, the first and second diffuser channels being situated opposite one another and configured symmetrically relative to the valve axis.

* * * * *